US005579469A

United States Patent [19]

Pike

[11] Patent Number: 5,579,469

[45] Date of Patent: Nov. 26, 1996

[54] GLOBAL USER INTERFACE

[75] Inventor: Robert C. Pike, Basking Ridge, N.J.

[73] Assignee: Lucent Technologies Inc., Murray Hill, N.J.

[21] Appl. No.: 545,376

[22] Filed: Oct. 19, 1995

Related U.S. Application Data

[63] Continuation of Ser. No. 267,643, Jun. 29, 1994, abandoned, and Ser. No. 712,212, Jun. 7, 1991, abandoned.

[51] Int. Cl.$^{6}$ .......... G06F 15/00

[52] U.S. Cl. .......... 395/326; 395/340

[58] Field of Search .......... 395/155–161, 395/144–149, 700

[56] References Cited

U.S. PATENT DOCUMENTS

| | | | |
|---|---|---|---|
| 4,692,858 | 9/1987 | Redford et al. | 395/157 |
| 4,953,080 | 8/1990 | Dysart et al. | 364/200 |
| 5,122,972 | 6/1992 | Richards et al. | 395/160 |
| 5,226,163 | 7/1993 | Karsh et al. | 395/700 |
| 5,251,294 | 10/1993 | Abelow | 395/148 |

FOREIGN PATENT DOCUMENTS

| | | | |
|---|---|---|---|
| 0286110 | 4/1988 | European Pat. Off. . | |
| 0317479 | 10/1988 | European Pat. Off. | G06F 15/40 |
| 0325885 | 12/1988 | European Pat. Off. | G06F 9/44 |
| 0438877 | 12/1990 | European Pat. Off. | G06F 3/033 |
| 2240200 | 7/1991 | United Kingdom | G06F 9/44 |

OTHER PUBLICATIONS

New Riverside University Dictionary; The Riverside Publishing Company; 1988, pp. 132, 304.

M. Reiser, "The Oberon System", Addition Wesley, New York, 1991, pp.

N. Wirth et al, "The Oberon System", Software Practice and Experience, Sep. 1989, vol. 19, No. 9, pp. 857–894.

P. Haberli, "ComMan: A Visual Programming language for Interactive Graphics", *Comp. Graph.,* vol. 22, #4, Aug. 1988, pp. 103–110.

J. Ousterhout, "Tcl: An Embeddable Command Language", Proc. USENIX Winter 1990 Conf., pp. 133–146.

N. Wirth and J. Gutknecht, "The Oberon System", *Software Practice and Experience,* Sep. 1989, vol. 19, No. 9, pp. 857–894.

W. Teitelman, "A Tour through Cedar", IEEE Software 1, No. 2, pp. 44–73.

R. Pike, et al., "Plan 9 from Bell Labs", Proc. of the Summer 1990 UKUUG Conf.,, London, Jul. 1990, pp. 1–9.

*Primary Examiner*—Mark R. Powell
*Assistant Examiner*—Ba Huynh
*Attorney, Agent, or Firm*—Gordon E. Nelson

[57] ABSTRACT

A system which is a combination of editor, window system, shell, and user interface and which provides a novel environment for the construction of textual applications such as browsers, debuggers, mailers, and so on. The system combines an extremely lean user interface with some automatic heuristics and defaults to achieve significant effects with minimal mouse and keyboard activity. The user interface is driven by a file-oriented programming interface that may be controlled from programs or even shell scripts. By taking care of user interface issues in a central utility, the system further simplifies the job of programming applications that make use of a bitmap display and mouse.

12 Claims, 11 Drawing Sheets

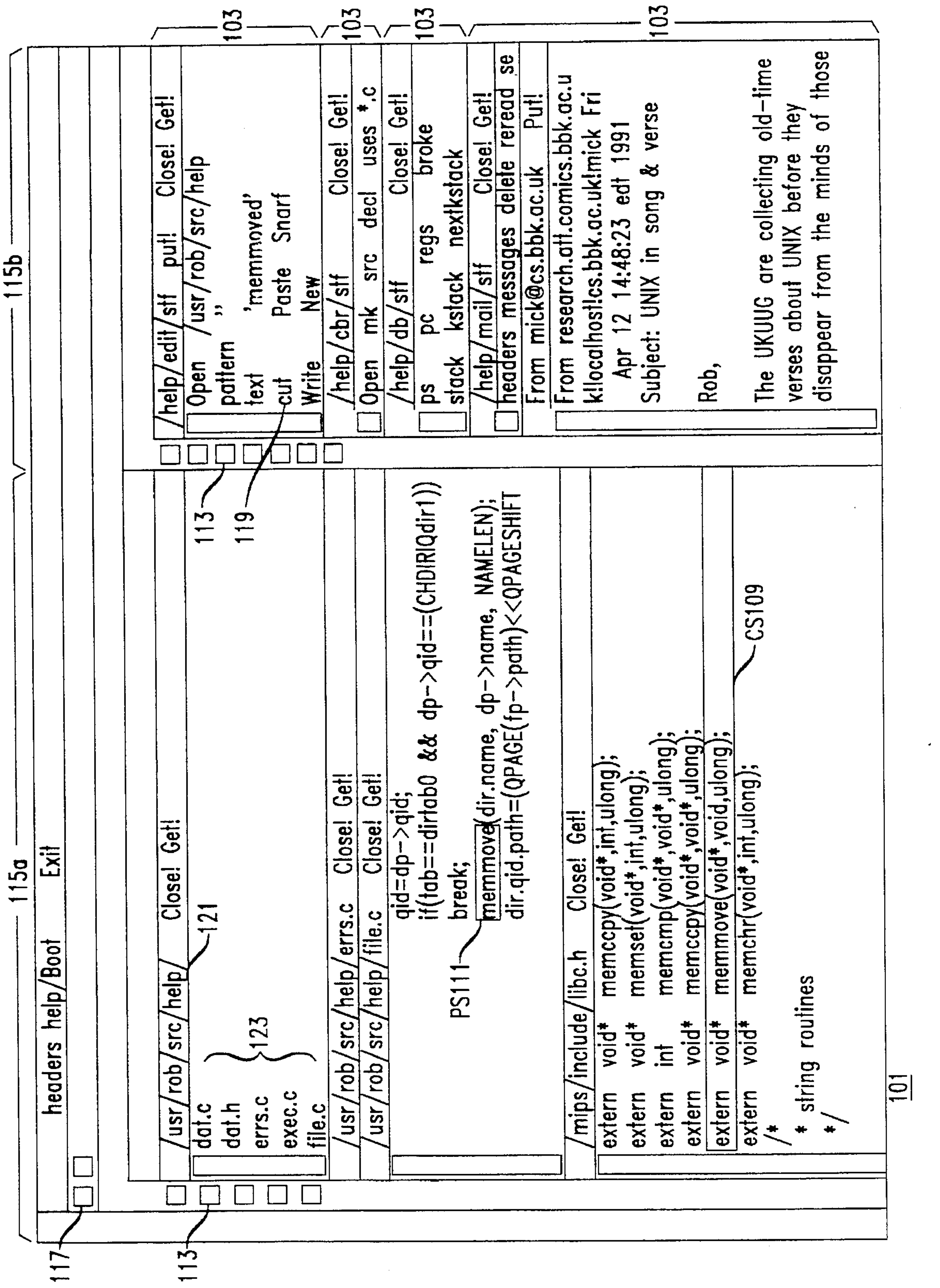

FIG. 1

[A rotated patent figure showing a windowed user interface with multiple panes containing file paths and code. Key visible text includes:]

headers help/Boot    Exit

/usr/rob/src/help/    Close! Get!

dat.c
dat.h
errs.c
exec.c
file.c

/usr/rob/src/help/errs.c    Close! Get!
/usr/rob/src/help/file.c    Close! Get!

```
qid=dp->qid;
if(tab==dirtab0 && dp->qid==(CHDIRIQdir1))
    break;
memmove(dir.name, dp->name, NAMELEN);
dir.qid.path=(QPAGE(fp->path)<<QPAGESHIFT
```

/mips/include/libc.h    Close! Get!

```
extern  void*   memccpy(void*,int,ulong);
extern  void*   memset(void*,int,ulong);
extern  int     memcmp(void*,void*,ulong);
extern  void*   memcpy(void*,void*,ulong);
extern  void*   memmove(void*,void,ulong);
extern  void*   memchr(void*,int,ulong);
/*
 * string routines
 */
```

/help/edit/stf    put!    Close! Get!

Open    /usr/rob/src/help
pattern    ''
text    'memmoved'
cut    Paste    Snarf
Write    New /help/cbr/stf    Close! Get!
Open  mk  src  decl  uses *.c /help/db/stf    Close! Get!
ps  pc  regs  broke
stack  kslack  nextkslack /help/mail/stf    Close! Get!
headers  messages  delete  reread  se From mick@cs.bbk.ac.uk    Put!
From research.att.comics.bbk.ac.u
k!localhost!cs.bbk.ac.uk!mick Fri
Apr 12 14:48:23 edt 1991
Subject: UNIX in song & verse Rob, The UKUUG are collecting old-time
verses about UNIX before they
disappear from the minds of those

[Labels: 117, 113, 115a, 115b, 103, 121, 123, 119, PS111, CS109, 101]

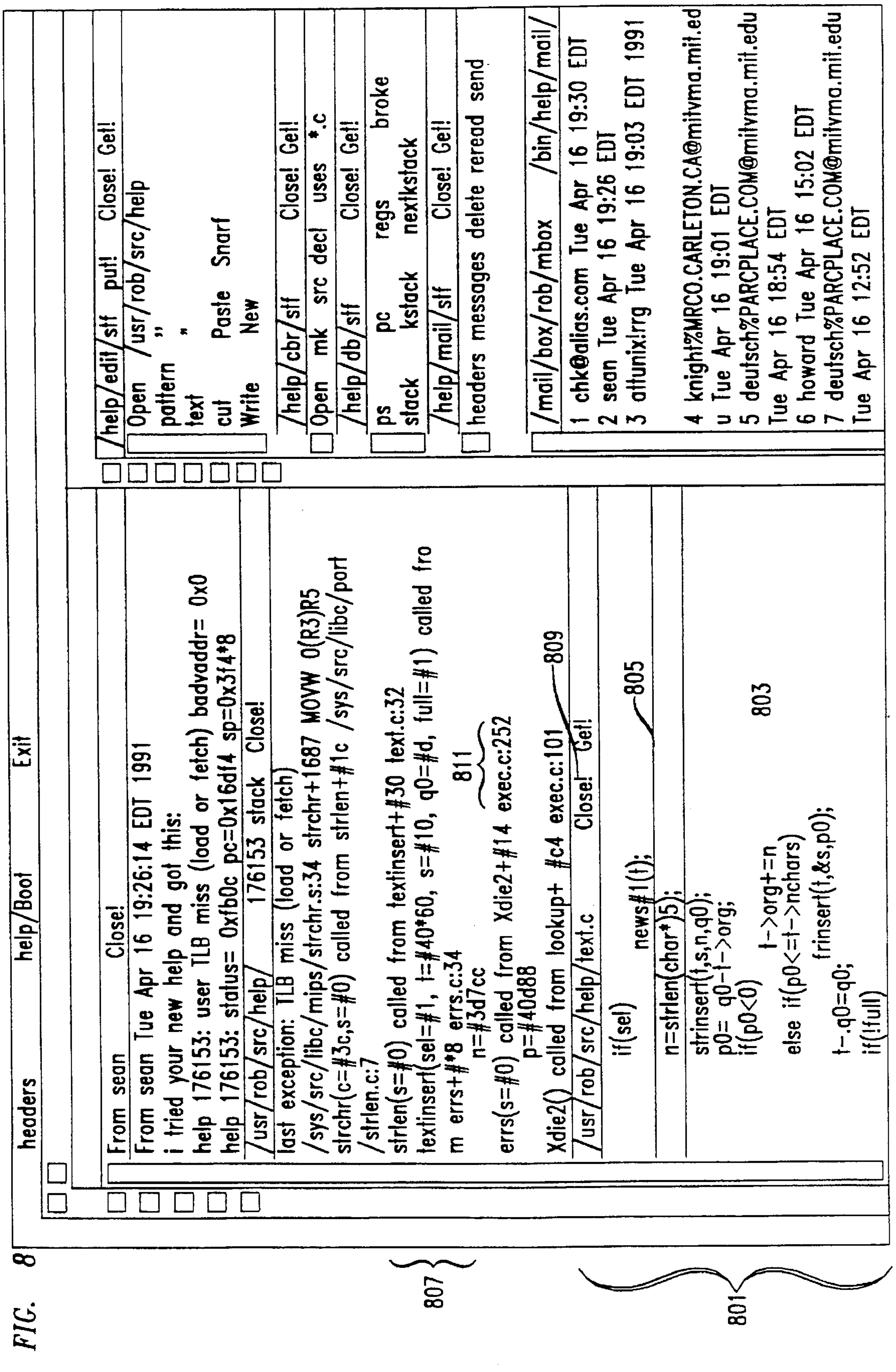

FIG. 8

Top panel (right side - mail/menu):

headers  /mail/box/rob/mbox  /bin/help/mail/

/help/edit/stf  put!  Close!  Get!

Open  /usr/rob/src/help
pattern  "  "
text  "  "
cut  Paste  Snarf
Write  New

/help/cbr/stf  Close!  Get!

Open  mk  src  decl  uses  *.c

/help/db/stf  Close!  Get!

ps        pc      regs    broke
stack    kslack  nextkstack

/help/mail/stf  Close!  Get!

headers  messages  delete  reread  send 1 chk@alias.com Tue Apr 16 19:30 EDT
2 sean Tue Apr 16 19:26 EDT
3 attunix!rrg Tue Apr 16 19:03 EDT 1991
4 knight%MRCO.CARLETON.CA@mitvma.mit.ed
u Tue Apr 16 19:01 EDT
5 deutsch%PARCPLACE.COM@mitvma.mit.edu
Tue Apr 16 18:54 EDT
6 howard Tue Apr 16 15:02 EDT
7 deutsch%PARCPLACE.COM@mitvma.mit.edu
Tue Apr 16 12:52 EDT

Bottom panel (left side - debug/code):

headers    help/Boot    Exit

From sean    Close!
From sean Tue Apr 16 19:26:14 EDT 1991
i tried your new help and got this:
help 176153: user TLB miss (load or fetch) badvaddr= 0x0
help 176153: status= 0xfb0c pc=0x16df4 sp=0x3f4*8

/usr/rob/src/help/    176153 stack  Close!

last exception: TLB miss (load or fetch)
/sys/src/libc/mips/strchr.s:34 strchr+1687 MOVW 0(R3)R5
strchr(c=#3c,s=#0) called from strlen+#1c /sys/src/libc/port
/strlen.c:7
strlen(s=#0) called from textinsert+#30 text.c:32
textinsert(sel=#1, t=#40*60, s=#10, q0=#d, full=#1) called
m errs+#*8 errs.c:34
          n=#3d7cc
errs(s=#0) called from lookup+ #c4 exec.c:252
          p=#40d88
Xdie2() called from lookup+ #c4 exec.c:101 — 809

/usr/rob/src/help/text.c    Close!  Get!

```
if(sel)
    news#1(t);                    — 805
n=strinsert(char*)5);
strinsert(t,s,n,q0);
p0= q0-t->org;
if(p0<0)                          803
    t->org+=n
else if(p0<=t->nchars)
    frinsert(t,&s,p0);
t-.q0=q0;
if(!full)
```

807

801

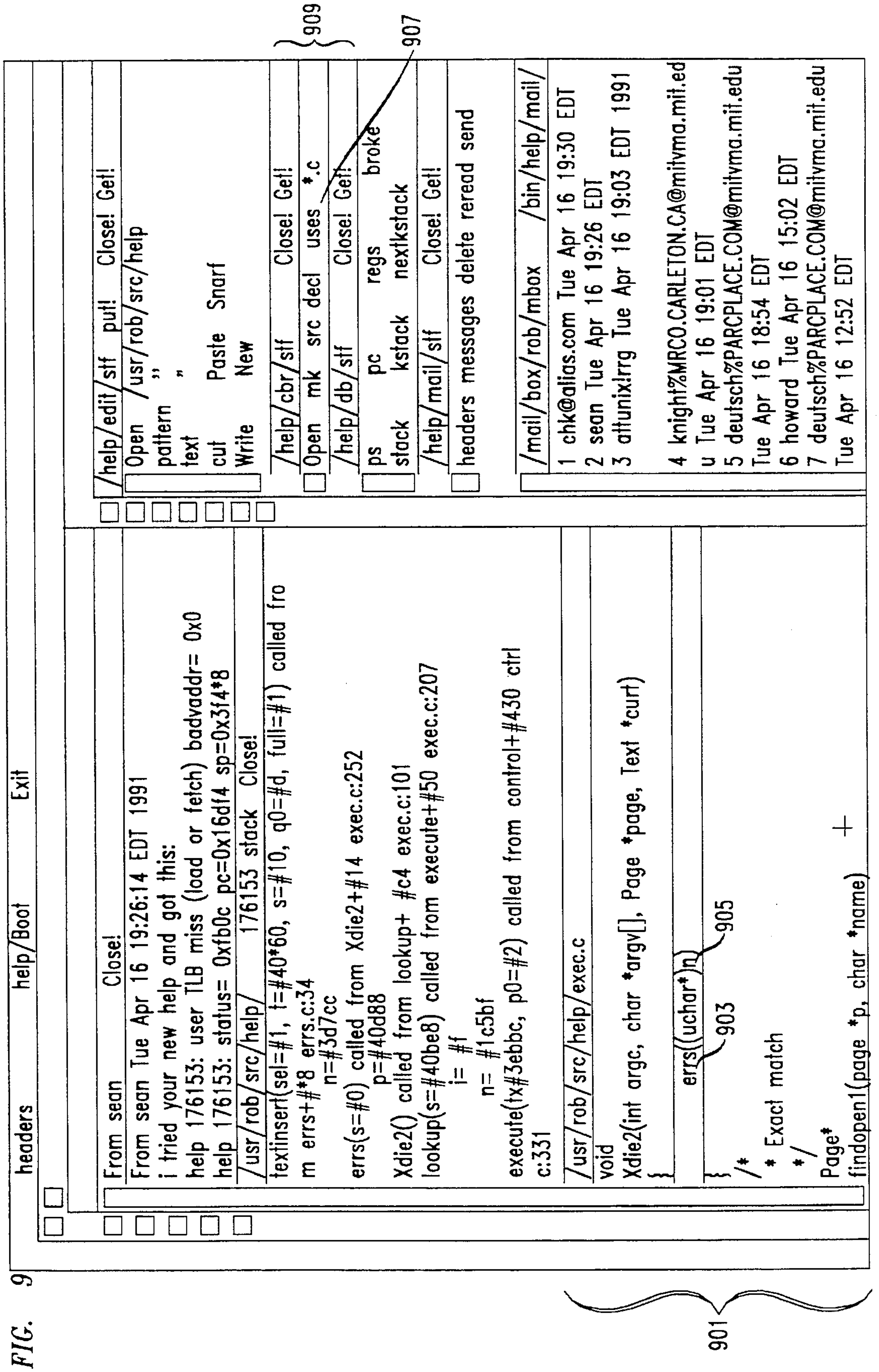

FIG. 9

```
headers          help/Boot          Exit
```

```
From sean   Close!
From sean Tue Apr 16 19:26:14 EDT 1991
i tried your new help and got this:
help 176153: user TLB miss (load or fetch) badvaddr= 0x0
help 176153: status= 0xfb0c pc=0x16df4 sp=0x3f4*8
```

```
/usr/rob/src/help/          176153 stack   Close!
textinsert(sel=#1, t=#40*60, s=#10, q0=#d, full=#1) called fro
m errs+#*8 errs.c:34
       n=#3d7cc
errs(s=#0) called from Xdie2+#14 exec.c:252
       p=#40d88
Xdie2() called from lookup+ #c4 exec.c:101
lookup(s=#40be8) called from execute+#50 exec.c:207
       i= #f
       n= #1c5bf
execute(tx#3ebbc, p0=#2) called from control+#430 ctrl
c:331
```

```
/usr/rob/src/help/exec.c
void
Xdie2(int argc, char *argv[], Page *page, Text *curt)
{
          errs((uchar*)n)
                 903      905
/*
 * Exact match
 */
Page*
findopen1(page *p, char *name)
```

```
/help/edit/stf   put!   Close!   Get!
Open   /usr/rob/src/help
pattern  "
text     "
cut      Paste   Snarf
Write    New
```

```
/help/cbr/stf                    Close! Get!
Open  mk  src  decl  uses  *.c          907
```

```
/help/db/stf                     Close! Get!
ps       pc       regs        broke
stack    kstack   nextkstack
```

```
/help/mail/stf                   Close! Get!
headers messages delete reread send
```

```
/mail/box/rob/mbox       /bin/help/mail/
1 chk@alias.com Tue Apr 16 19:30 EDT
2 sean Tue Apr 16 19:26 EDT
3 attunixIrrg Tue Apr 16 19:03 EDT 1991
4 knight%MRCO.CARLETON.CA@mitvma.mit.ed
u Tue Apr 16 19:01 EDT
5 deutsch%PARCPLACE.COM@mitvma.mit.edu
Tue Apr 16 18:54 EDT
6 howard Tue Apr 16 15:02 EDT
7 deutsch%PARCPLACE.COM@mitvma.mit.edu
Tue Apr 16 12:52 EDT
```

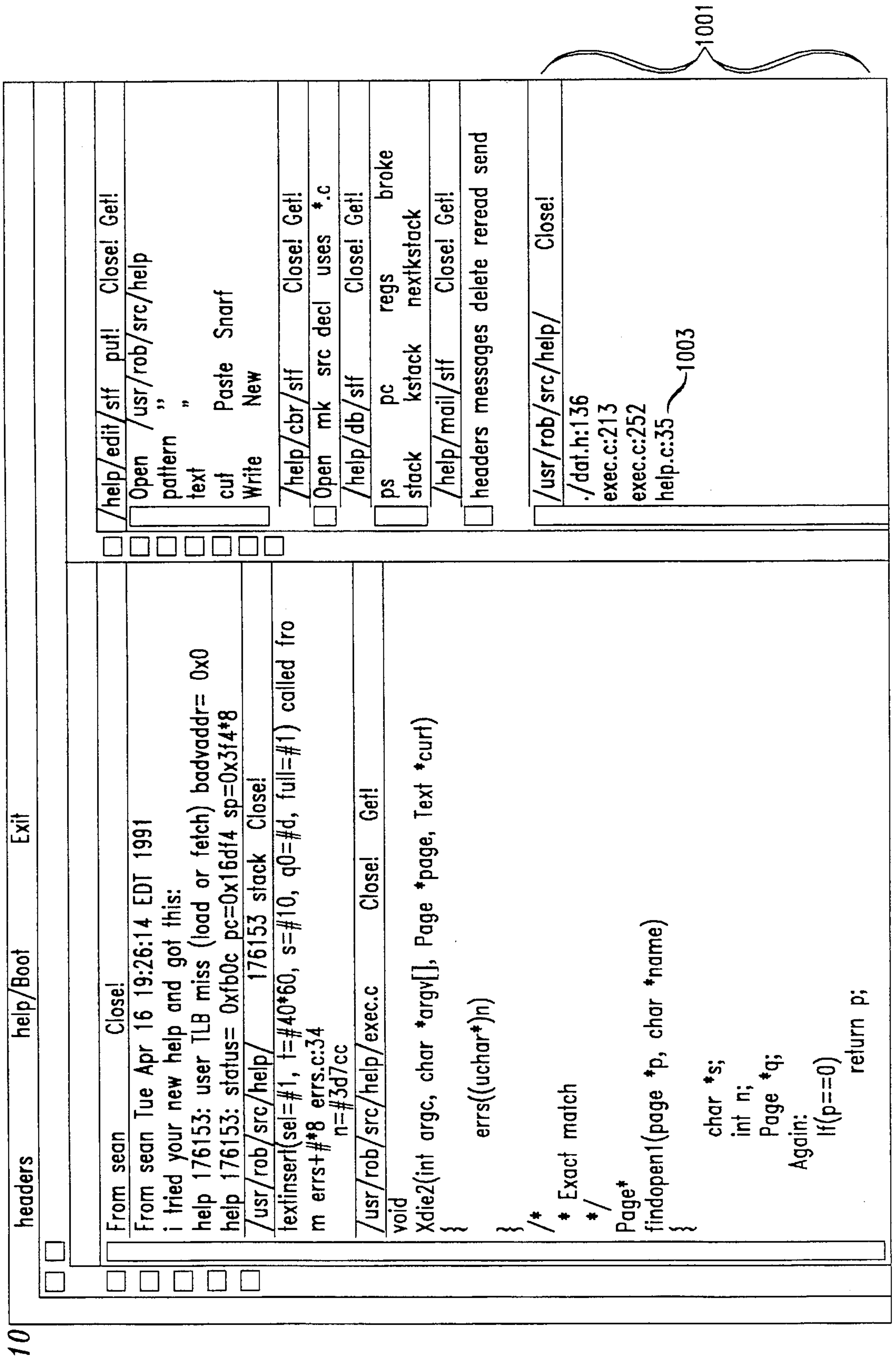

FIG. 10

```
headers          help/Boot          Exit

From sean    Close!
From sean Tue Apr 16 19:26:14 EDT 1991
i tried your new help and got this:
help 176153: user TLB miss (load or fetch) badvaddr= 0x0
help 176153: status= 0xfb0c pc=0x16df4 sp=0x3f4*8
/usr/rob/src/help/         176153 stack  Close!
textinsert(sel=#1, t=#40*60, s=#10, q0=#d, full=#1) called fro
m errs+#8 errs.c:34
           n=#3d7cc
/usr/rob/src/help/exec.c      Close!   Get!
void
Xdie2(int argc, char *argv[], Page *page, Text *curt)
{
        errs((uchar*)n)
}
/*
 * Exact match
 */
Page*
findopen1(page *p, char *name)
{
        char *s;
        int n;
        Page *q;
Again:
        If(p==0)
                return p;
```

/help/edit/stf   put!   Close!  Get!
Open    /usr/rob/src/help
pattern   "
text      "
cut     Paste   Snarf
Write     New /help/cbr/stf             Close!  Get!
Open  mk  src  decl  uses  *.c /help/db/stf              Close!  Get!
ps       pc      regs      broke
stack    kstack  nextkstack /help/mail/stf            Close!  Get!
headers messages delete reread send /usr/rob/src/help/        Close!
./dat.h:136
exec.c:213
exec.c:252
help.c:35 ——1003

1001

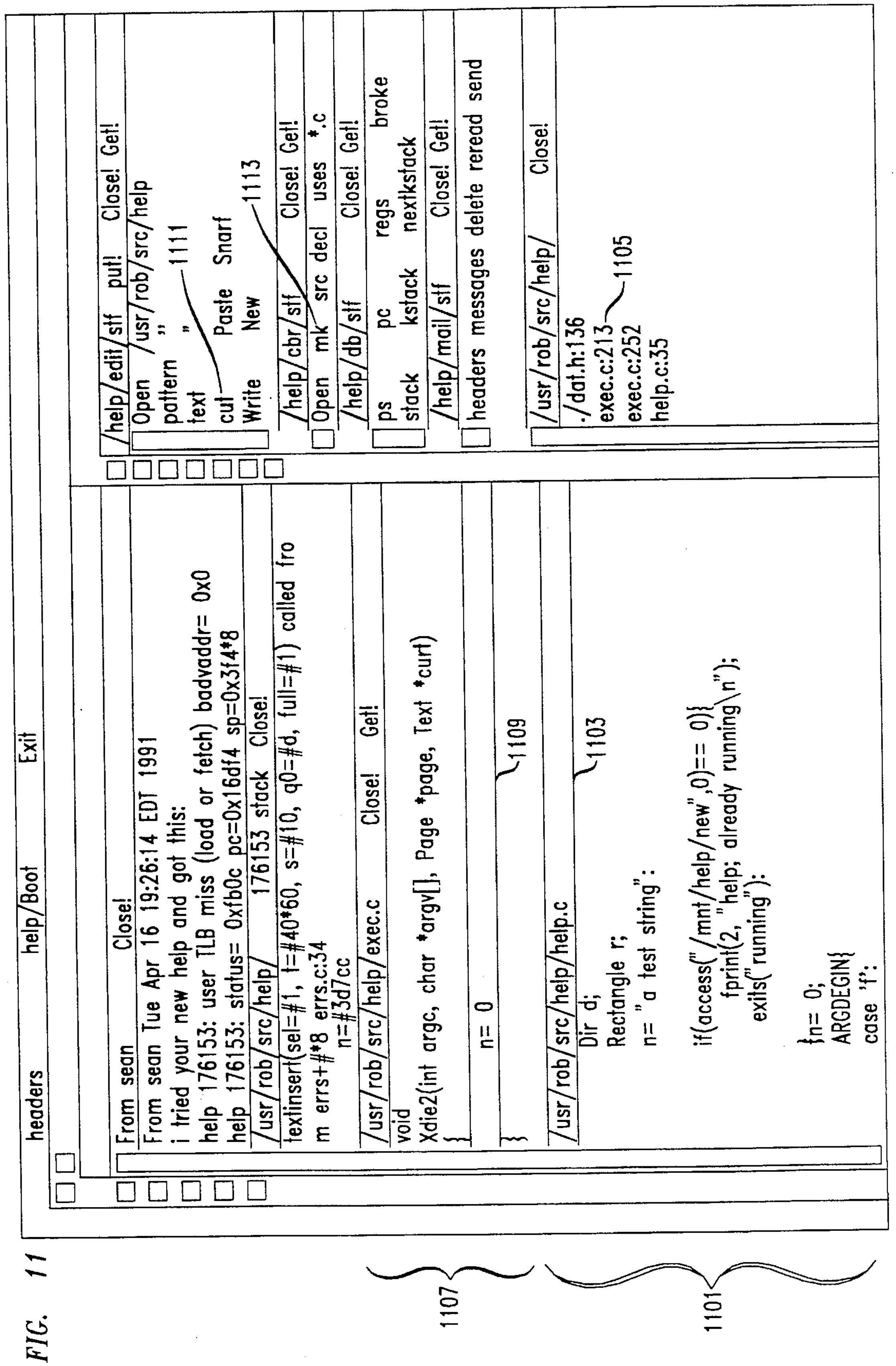

FIG. 11 headers    help/Boot    Exit

From sean    Close!
From sean Tue Apr 16 19:26:14 EDT 1991
i tried your new help and got this:
help 176153: user TLB miss (load or fetch) badvaddr= 0x0
help 176153: status= 0xfb0c pc=0x16df4 sp=0x3f4*8
/usr/rob/src/help/    176153 stack  Close!
textinsert(sel=#1, t=#40*60, s=#10, q0=#d, full=#1) called fro
m errs+#8 errs.c:34
    n=#3d7cc
/usr/rob/src/help/exec.c    Close!    Get!
void
Xdie2(int argc, char *argv[], Page *page, Text *curt)
{
    n= 0    ~1109
}
/usr/rob/src/help/help.c    ~1103
    Dir d;
    Rectangle r;
    n= " a test string";
    if(access("/mnt/help/new",0)== 0){
        fprint(2, "help; already running\n");
        exits("running");
    }
    {n= 0;
    ARGBEGIN{
    case 'f':

1107
1101

/help/edit/stf   put!   Close!   Get!
Open    /usr/rob/src/help
pattern   "    1111
text      "
cut      Paste    Snarf
Write    New      1113

/help/cbr/stf    Close!   Get!
Open   mk   src decl  uses *.c

/help/db/stf    Close!   Get!
ps       pc       regs     broke
stack    kstack   nextkstack /help/mail/stf    Close!   Get!
headers messages delete reread send /usr/rob/src/help/    Close!
./dat.h:136
exec.c:213   1105
exec.c:252
help.c:35

GLOBAL USER INTERFACE

This application is a continuation of application Ser. No. 08/267,643, filed on Jun. 29, 1994 and Ser. No. 07/712,212 filed on Jun. 7, 1991 now abandoned.

BACKGROUND OF THE INVENTION

1. Field of the Invention

The techniques disclosed herein concern user interfaces to computers generally and more specifically interactive user interfaces which employ windows and pointing devices.

2. Description of the Prior Art

The problem of designing appropriate graphical user interfaces to the UNIX® system is vexing and largely unsolved, even today, ten years after bitmap displays were first attached to UNIX systems. In those ten years, graphical applications have become major subsystems that sidestep or even subvert some of the properties of UNIX that helped make it popular, in particular its piece-parts, tool-based approach to programming. Although there have been some encouraging recent attempts, in particular ConMan, described in Paul Haberli, "ConMan: A Visual Programming Language for Interactive Graphics", Comp. Graph., Vol. 22, #4 August 1988, pp. 103–110, and Tcl, described in John Ousterhout, "Tcl: An Embeddable Command Language", Proc. USENIX Winter 1990 Conf., pp. 133–146, they have taken the form of providing interprocess communication within existing environments, permitting established programs to talk to one another. None has approached the problem structurally. Moreover, they are minor counterexamples to the major trend, which is to differentiate among systems by providing ever larger, fancier, and more monolithic graphics subsystems rather than by increasing the functionality or programmability of the overall system. To the software developer, that trend is problematical; modem user interface toolkits and window systems are as complex as the systems UNIX displaced with its elegant, simple approach.

The system of the invention, termed herein Help is an experimental program that combines aspects of window systems, shells, and editors to provide an improved user interface for textual applications. It is not a 'toolkit'; it is a self-contained program, more like a shell than a library, that joins users and applications. From the perspective of the application, it provides a universal communication mechanism, based on familiar UNIX file operations, that permits small applications—even shell procedures—to exploit the graphical user interface of the system and communicate with each other. For the user, the interface is extremely spare, consisting only of text, scroll bars, one simple kind of window, and a unique function for each mouse button—no widgets, no icons, not even pop-up menus. Despite these limitations, help is an effective environment in which to work and, particularly, to program.

Help's roots lie in Wirth's and Gutknecht's Oberon system, described in N. Wirth and J. Gutknecht, "The Oberon System", Software Practice and Experience, September 1989, vol 19, no. 9, pp 857–894 and in Martin Reiser, *The Oberon System*, Addison Wesley, New York 1991. Oberon is an attempt to extract the salient features of Xerox's Cedar environment, described in W. Teitelman, "A Tour through Cedar", IEEE Software 1, no. 2, pp. 44–73, and implement them in a system of manageable size. It is based on a module language, also called Oberon, and integrates an operating system, editor, window system, and compiler into a uniform environment. Its user interface is especially simple: by using the mouse to point at text on the display, one indicates what subroutine in the system to execute next. In a normal UNIX shell, one types the name of a file to execute; instead in Oberon one selects with a particular button of the mouse a module and subroutine within that module, such as Edit.Open to open a file for editing. Almost the entire interface follows from this simple idea.

A major difficulty with the Oberon system is that it has a single process and is language oriented. Modern computing systems are typically multi-process systems and are file oriented instead of language oriented. It is thus an object of the invention to secure the advantages of Oberon's user interface in such multi-process and file-oriented computing systems.

SUMMARY OF THE INVENTION

In one aspect, the invention is a method for defining an input to a computer system having at least one window. The method has steps including associating the window with a context; accepting a string of text selected from anywhere in the window; and providing the string of text together with the context as the input. This and other aspects and advantages of the invention will be clear to those of ordinary skill in the art upon perusal of the Drawing and Detailed Description, wherein:

BRIEF DESCRIPTION OF THE DRAWING

FIG. 1 shows the display provided by the invention;

FIG. 8 shows how the selected portion of the code is displayed in a window;

FIG. 9 shows how an operation of finding places where a variable is used is defined;

FIG. 10 shows how the places where the variable is used are displayed in a window; and FIG. 11 shows how the code at the places where the variable is used is displayed in windows.

Reference numbers employed in the following Detailed Description have two parts. The two right-most digits are reference numbers within a figure; the remaining digits to the left are figure numbers; thus a reference number 1003 refers to an item which appears for the first time in FIG. 10.

DETAILED DESCRIPTION

In the following, the basics of the user interface provided by Help are first described; thereafter, an example is given of how the user interface might be used in locating and fixing a bug in a program.

Figure 2:
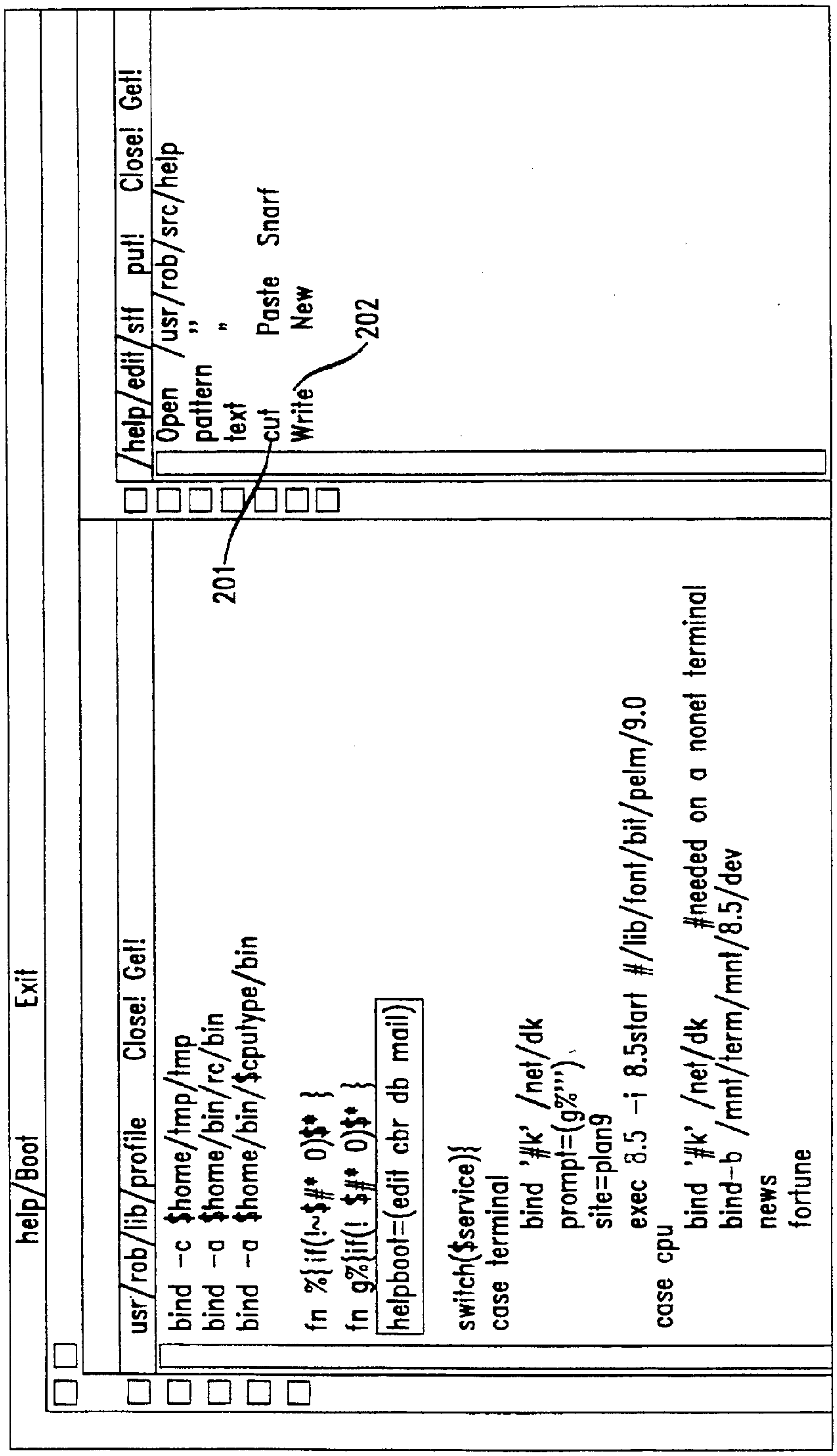
FIG. 2 shows how a command is input from the display.
Figure 3:
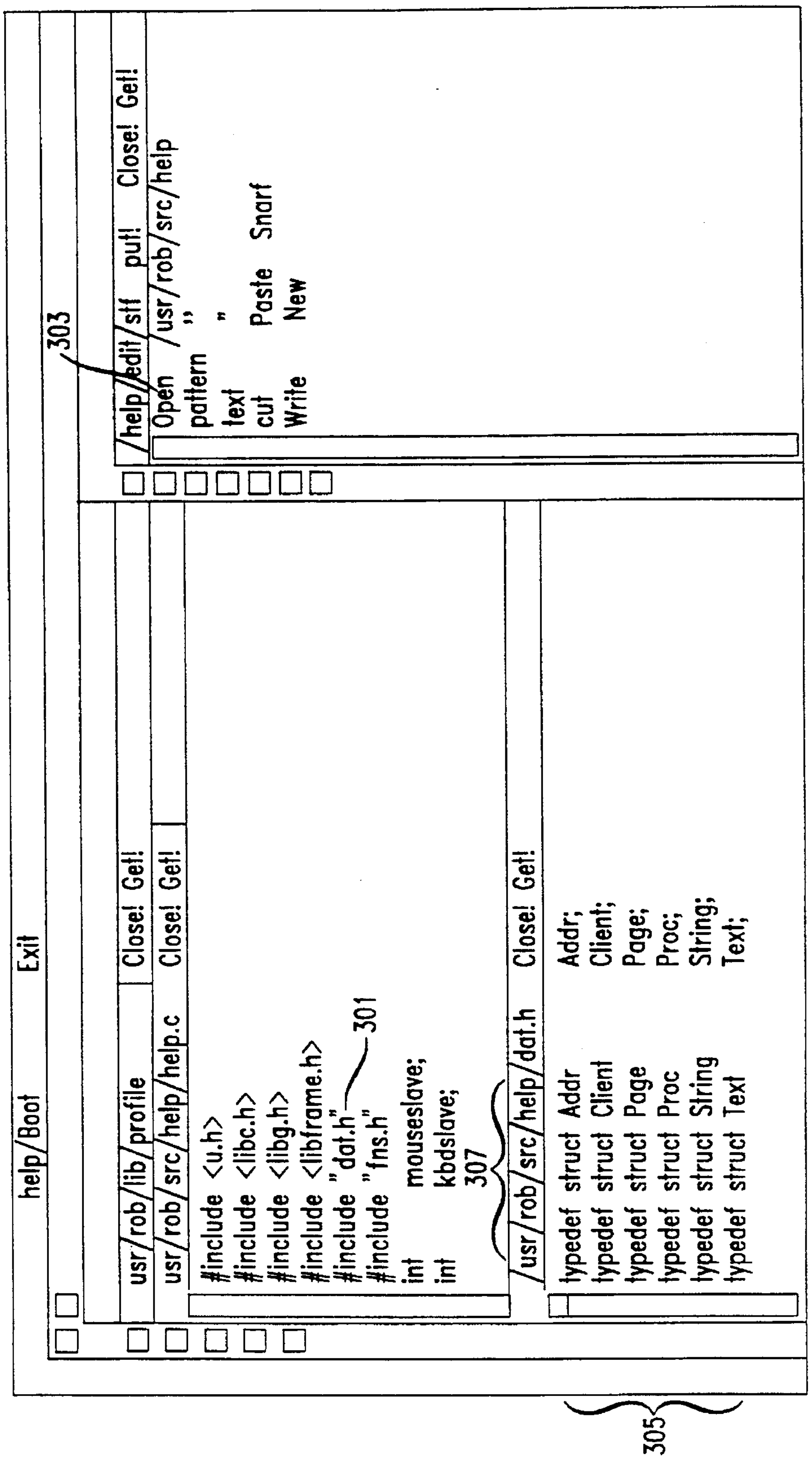
FIG. 3 shows how contexts are defined for names.

Basic User Interface: FIGS. 1–3

In a presently-preferred embodiment, Help operates only on text which is displayed in a window; in other embodiments, the techniques set forth here may be used with icons or other non-text representations of entities. In the preferred embodiment, the interface to Help are a three-button mouse and keyboard. In other embodiments, other pointing devices may be employed, including one and two button mice and pen devices. The fundamental operations are to type text with the keyboard and to control the screen and execute commands with the mouse buttons. Text may be selected with the left and middle mouse buttons. The middle button selects text defining the action to be executed; the left selects the object of that action. The right button controls the placement of windows. Note that typing does not execute commands; newline is just a character.

Several interrelated rules were followed in the design of the interface. These rules are intended to make the system as efficient and comfortable as possible for its users. First, brevity: there should be no actions in the interface—button clicks or other gestures—that do not directly affect the system. Thus help is not a 'click-to-type' system because that click is wasted; there are no pop-up menus because the gesture required to make them appear is wasted; and so on. Second, no retyping: it should never be necessary or even desirable to retype text that is already on the screen. Many systems allow the user to copy the text on the screen to the input stream, but for small pieces of text such as file names it often seems easier to retype the text than to use the mouse to pick it up. As a corollary, when not typing genuinely new text, such as when browsing source code or debugging, it should be possible to work efficiently and comfortably without using the keyboard at all. Third, automation: let the machine fill in the details and make mundane decisions. For example, it should be good enough just to point at a file name, rather than to pass the mouse over the entire textual string. Finally, defaults: the most common use of a feature should be the default. Similarly, the smallest action should do the most useful thing. Complex actions should be required only rarely and when the task is unusually difficult.

As shown in FIG. 1, the help screen 101 is tiled with windows 103 of editable text, arranged in (typically) two side-by-side columns 115(*a*) and (*b*). In other embodiments there may be only a single column or more than two columns FIG. 1 shows help screen 101 in mid-session. Each window 103 has two subwindows, a single tag line 105 across the top and a body of text 107. Tag 105 typically contains the name of the file whose text (or a copy thereof) appears in body 107.

The text in each subwindow (tag 105 or body 107) may be edited using a simple cut-and-paste editor integrated into the system. The left mouse button selects text; the selection is that text between the point where the button is pressed and where it is released. Each subwindow has its own selection. One subwindow—the one with the most recent selection or typed text—is the location of the current selection 109 and its selection appears in reverse vide. The selection in other subwindows appears in outline, as seen at PS 111.

Typed text replaces the selection in the subwindow under the mouse. The right mouse button is used to rearrange windows 103. The user points at tag 105 of a window 103, presses the tight button, drags the window to where it is desired, and releases the button. Help then does whatever local rearrangement is necessary to drop the window to its new location (the rule of automation). This may involve coveting up some windows or adjusting the position of the moved window or other windows. Help attempts to make at least the tag of a window fully visible; if this is impossible, it covers the window completely.

A tower of small black tabs 113, one per window, adorns the left edge of each column 115. These tabs 113 represent the windows in that column 115, visible or invisible, in order from top to bottom of the column, and can be clicked with the left mouse button to make the corresponding window fully visible, from its tag 105 to the bottom of the column it is in. A similar row across the top of the columns allows the columns to expand horizontally. These little tabs are a solution to the problem of managing many overlapping windows.

Like the left mouse button, the middle button also selects text, but the act of releasing the button does not leave the text selected; rather it executes the command indicated by that text. For example, to cut some text from the screen, one selects the text with the left button, then selects with the middle button the word Cut 119 anywhere it appears on the display. (By convention, capitalized commands represent built-in functions.) As in any cut-and-paste editor, the cut text is remembered in a buffer and may be pasted into the text elsewhere. If the text of the command name is not on the display, one just types it and then executes it by selecting with the middle button. Note that Cut 119 is not a 'button' in the usual window system sense; it is just a word, wherever it appears, that is bound to some action. To make things easier, help interprets a middle mouse button click (not double click) anywhere in a word as a selection of the whole word (the rule of defaults). Thus one may just select the text normally, then click on Cut with the middle button, involving less mouse activity than with a typical pop-up menu. As shown at 201 in FIG. 2, the text selected for execution is underlined. Arrow 202 indicates the current cursor position. As a strict rule, if the text for selection or execution is the null string, help invokes automatic actions to expand it to a file name or similar context-dependent block of text; if the text is non-null, it is taken literally.

As an extra acceleration, help has two commands invoked by chorded mouse buttons. While the left button is still held down after a selection, clicking the middle button executes Cut; clicking the right button executes Paste, replacing the selected text by the contents of the cut buffer. These are the most common editing commands and it is convenient not to move the mouse to execute them (the rules of brevity and defaults). One may even click the middle and then right buttons, while holding the left down, to execute a cut-and-paste, that is, to remember the text in the cut buffer for later pasting.

More than one word may be selected for execution; executing Open /user/rob/lib/profile creates a new window and puts the contents of the file in it. (If the file is already open, the command just guarantees that its window is visible.) Again, by the rule of automation, the new window's location will be chosen by help.

A typical shell window in a traditional window system permits text to be copied from the typescript and presented as input to the shell to achieve some son of history function: the ability to re-execute a previous command. Help instead tries to predict the future: to get to the screen commands and text that will be useful later. Every piece of text on the screen is a potential command or argument for a command. Many of the basic commands pull text to the screen from the file system with a minimum of fuss. For example, if Open is executed without an argument, it uses the file name containing the most recent selection (the rule of defaults). Thus one may just point with the left button at a file name and then with the middle button at Open to edit a new file. Using all four of the rules above, if Open is applied to a null selection in a file name that does not begin with a slash /), the directory name is extracted from the file name in the tag of the window and prepended to the selected file name. An elegant use of this is in the handling of directories. When a directory is Opened, help puts the its name 121, including a final slash, in the tag and just lists the contents 123 (i.e., the names of the files in the directory) in the body. For example, as shown in FIG. 3, by pointing at dat.h 301 in the source file /usr/rob/src/help/help.c and executing Open, a new window 305 is created containing the contents of /usr/rob/src/help/dat.h: all it takes is two button clicks. Making any non-null selection disables all such automatic actions: the resulting text is then exactly what is selected.

That Open prepends the directory name gives each window a context: the directory in which the file resides. The various commands, built-in and external, that operate on files derive directory 307 in which to execute from tag line 105 of window 305. Help has no explicit notion of current working directory; each command operates in the directory appropriate to its operands.

The Open command has a further nuance: if the file name is suffixed by a colon and an integer, for example help. c:27, the window will be positioned so the indicated line is visible and selected. Help's syntax further permits specifying general locations, although only line numbers will be specified in the following examples.

It is possible to execute any external operating system command. If a command is not a built-in like Open, it is assumed to be an executable file and the arguments are passed to the command to be executed. For example, if one selects with the middle button the text grep '^main' /sys/src/cmd/help/*.c the traditional grep command will be executed. Again, some default rules come into play. If the tag line 105 of the window 103 containing the command has a file name and the command does not begin with a slash, the directory of the file will be prepended to the command. If that command cannot be found, the command will be searched for in the conventional directory/bin. The standard input of the commands is connected to /dev/null; the standard and error outputs are directed to a special window, called Errors, that will be created automatically if needed. The Errors window is also the destination of any messages printed by the built-in commands.

Example of Operation: FIGS. 4–11

The interplay and consequences of these rules are easily seen by watching the system in action. In the following example, the Help system is used to fix a simple bug in a program. The bug has been reported in a mail message sent by a user named Sean.

Figure 4:
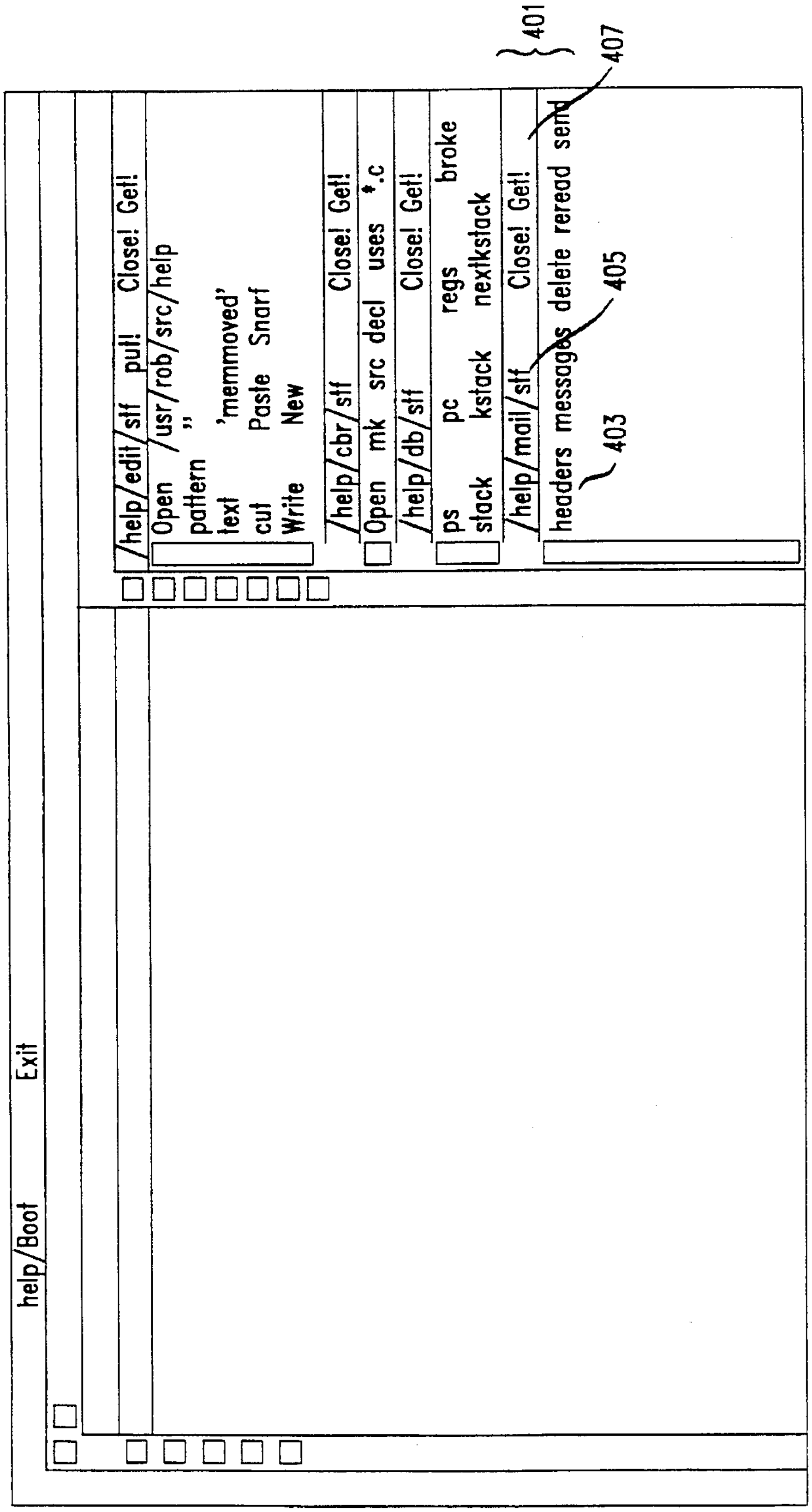
FIG. 4 shows how the operation of reading mail headers is defined.

When help starts it loads a set of 'tools' into the right hand column of its initially two-column screen. These are files with names like /help/edit/stf (the stuff that the help editor provides), /help/mail/stf, and so on. Each is a plain text file that lists the names of the commands available as parts of the tool, collected in the appropriate directory. A help window on such a file behaves much like a menu, but is really just a window on a plain file. The useful properties stem from the interpretation of the file applied by the rules of help; they are not inherent in the file. Turning to FIG. 4, mail is read by executing the program headers in the mail tool, that is, I click the middle mouse button on the word headers 403 in window 401 containing the file/help/mail/stf. This executes the program /help/mail/headers by prefixing the directory name of the file /help/mail/stf, 405, collected from tag 407, to the executed word, headers. This simple mechanism makes it easy to manage a collection of programs in a directory.

Figure 5:
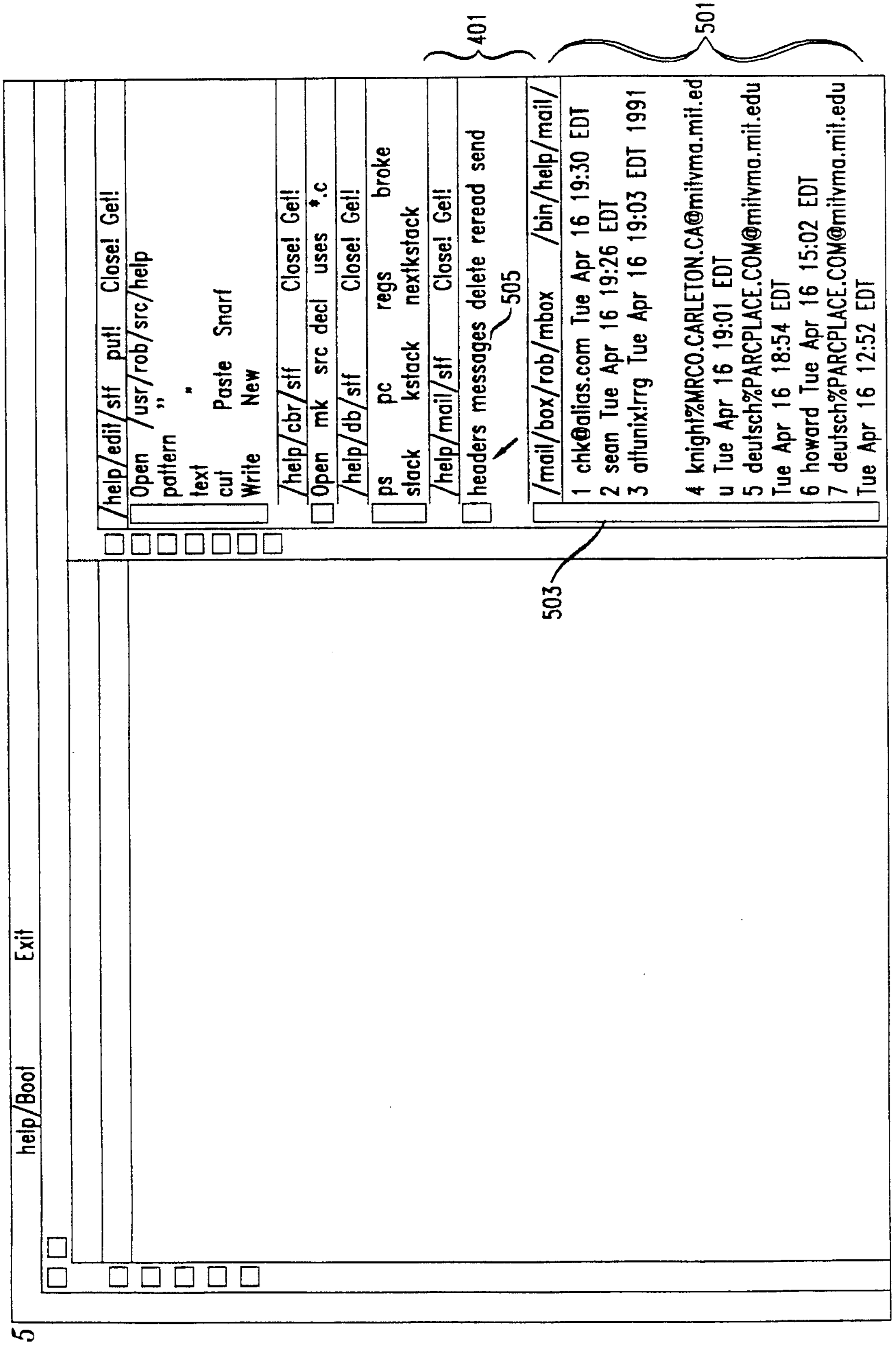
FIG. 5 shows how the headers are displayed in a window.
Figure 6:
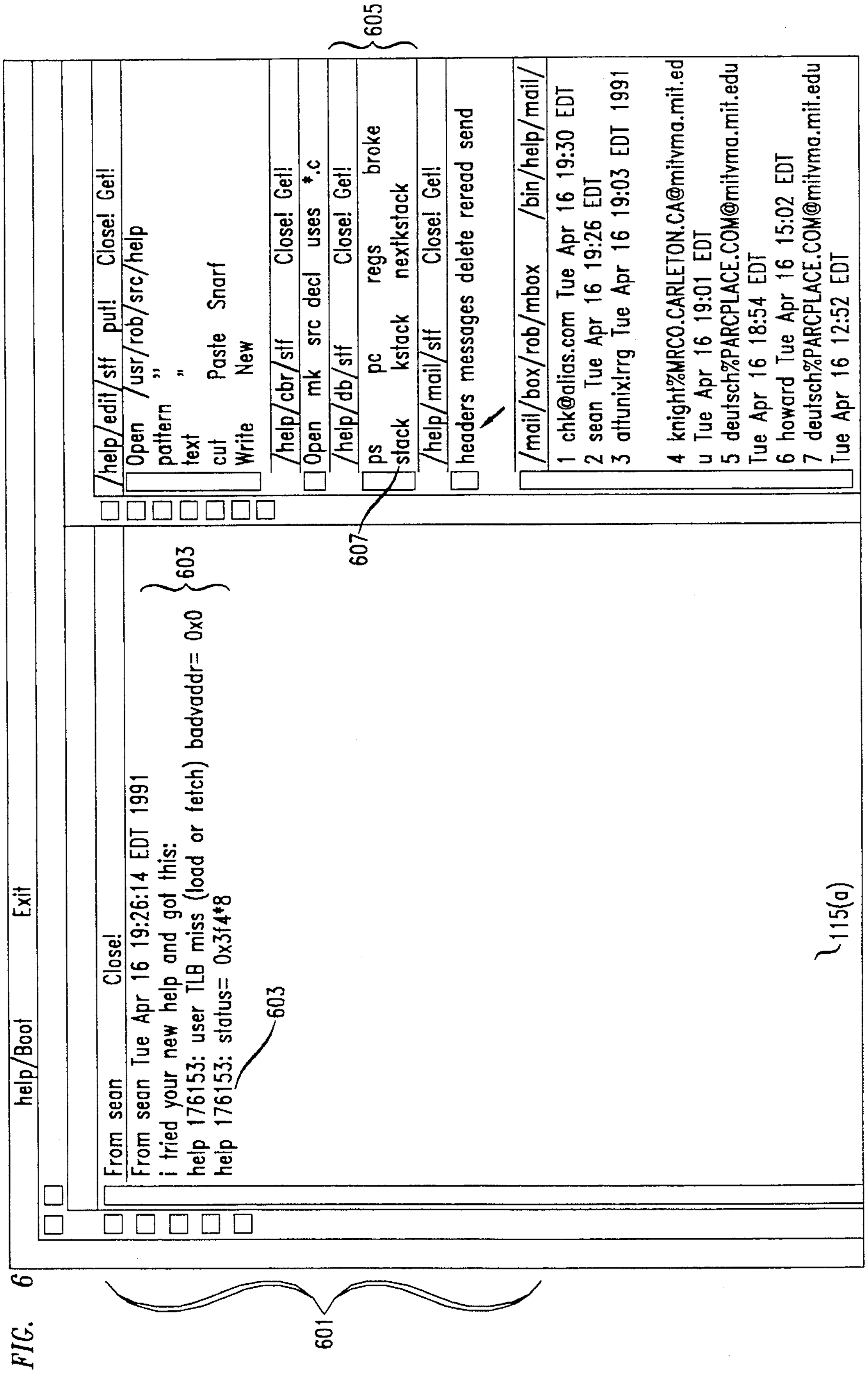
FIG. 6 shows how an operation of viewing a process's stack is defined.

As seen in FIG. 5, Headers creates a new window 501 containing the headers of the mail messages, and labels it /mail/box/rob/mbox. I know Sean has sent me mail, so I point at header 503 of his mail (just pointing with the left button anywhere in the header line will do) and click on messages 505. Help responds as shown in FIG. 6. It opens a new window 601 in left-hand column 115(*a*). Message 603 is displayed in window 601. Message 603 indicates that a new version of help has crashed and a broken process lies about waiting to be examined. The message includes process number 603 of the broken process; all that is needed to he done in order to look at the process's stack is to point at process number 603 and execute stack 607 in the window 605 for the debugger tool, /help/db/stf.

Figure 7:
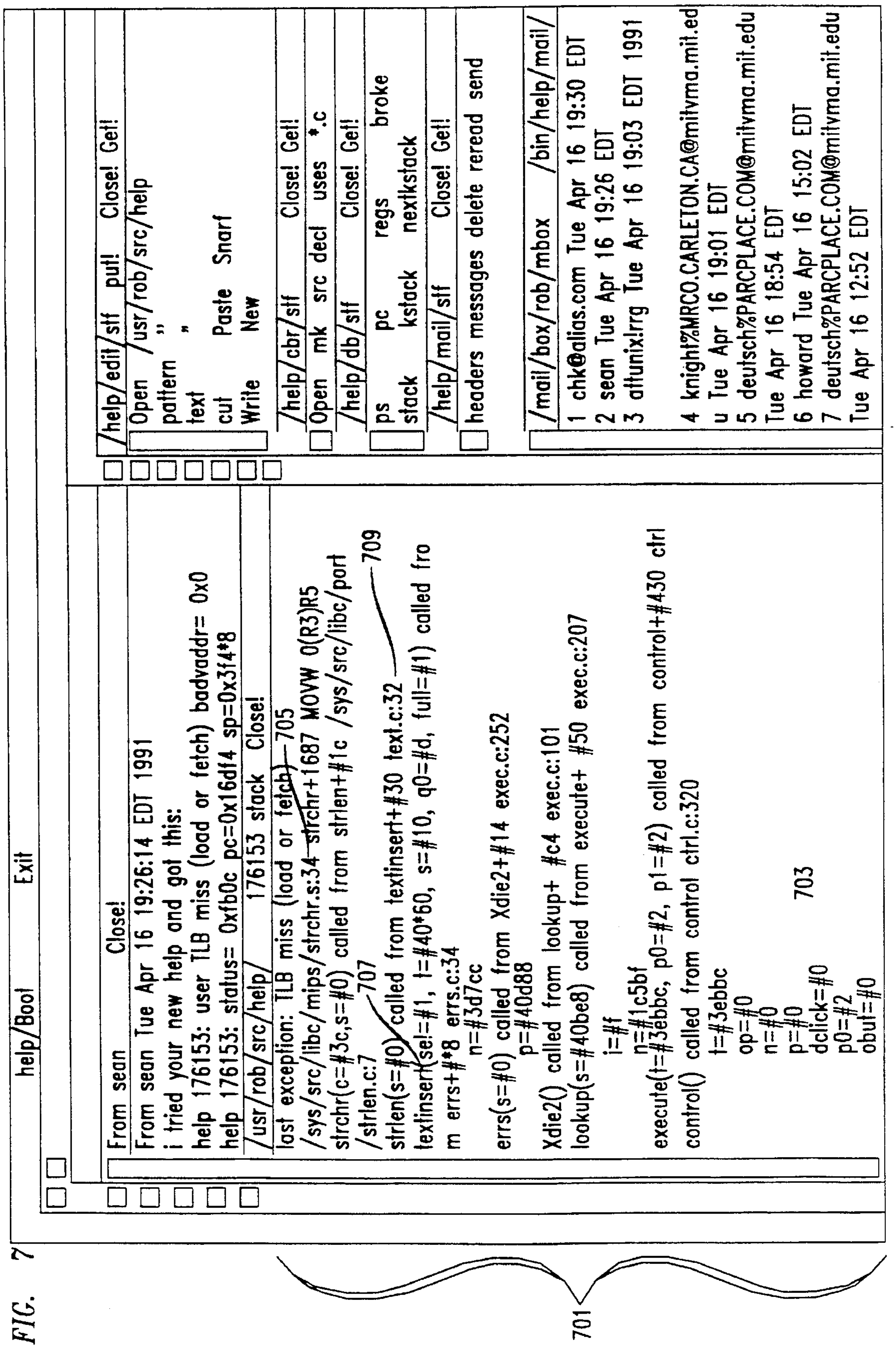
FIG. 7 shows how a portion of the stack is displayed and how a portion of the code for a function is selected for viewing.

The result of the execution of the stack program is shown in FIG. 7. A new window, 701, has appeared in column 115(*a*). The contents 703 of window 701 are a a traceback of the calls made by the process. Notice that this new window has many file names in it. These are extracted from the symbol table of the broken program. One can look at the line (of assembly language) that died by pointing at the entry /sys/src/libc/mips/strchr.s:34 705 and executing Open, but the problem probably lies further up the call stack. The deepest routine in help is text insert 707, which calls strlen on line 32 of the file text.c. To look at the place where the trouble seems to have occurred, one points at the identifying text in the stack window and executes open to see the source, which appears in window 801 of FIG. 8. The problem is coming to light: as indicated at 807, s, the argument to strlen, is zero, and was passed as an argument to textinsert by the routine errs, which apparently also got it as an argument from Xdie2. To close the window on text.c, one hits Close! 809 in the tag of window 801. By convention, commands ending in an exclamation mark take no arguments; they are window operations that apply to the window in which they are executed. The next step is examining the source of the suspiciously named Xdie2 by pointing at stack trace 703 and Opening again.

Help responds as shown in FIG. 9. Window 901 contains line 252 (indicated by the reverse video) of exec.c. Now the problem gets harder. The argument passed to errs 903 is a variable, n 905 that appears to be global. Who set it to zero? The c browser tool /help/cbr/stf, in window 909, lets me find out. The program uses*.c in that window displays all references in a given file to a given variable. To employ uses*.c to find all references to the variable n in /usr/rob/src/help/*.c, one points at the variable in the source text and executes uses *.c by sweeping both 'words' with the middle button in /help/cbr/stf. As shown in FIG. 10, uses creates a new window 1001 with a list in which the locations of all references to the variable n in the files /usr/rob/src/help/*.c are indicated by file name and line number. The implementation of the C browser is described below; in a nutshell, it parses the C source to interpret the symbols dynamically.

The first item on the list in window 1001 is clearly the declaration in the header file. It looks like help.c:35 1003 should be an initialization. To find out, one uses Open help.c to examine that line and see that the variable is indeed initialized. The result of the Open is shown in FIG. 11. Window 1101 shows line 35 of help.c at 1103. The line indicates that n 905 was set; some other use of n must have cleared it. Line 252 of exec.c is the call; that's a read, not a write, of the variable. The next possibility is exec. c:213; on pointing to that and again executing Open, window 1107 appears; as shown there at reverse video line 1109, n is set to 0. Sometime before Xdie2 was executed, Xdie1 cleared n. The bug is fixed by selecting Cut 1111 to remove the offending line, selecting Put!, which appears in the tag of a modified window, to write the file back out and then selecting mk 1113 in /help/cbr to compile the program. It is worth noting that the entire debugging operation of the example was done without touching the keyboard.

This demonstration illustrates several things besides the general flavor of help. It is easy to work with files and commands in multiple directories. The rules by which help constructs file names from context and, transitively, by which the utilities derive the context in which they execute simplify the management of programs and other systems constructed from scattered components. Also, the few common rules about text and file names allow a variety of applications to interact through a single user interface. For example, none of the tool programs has any code to interact directly with the keyboard or mouse. Instead help passes to an application the file and character offset of the mouse position. Using the interface described in the next section, the application can then examine the text in the window to see what the user is pointing at. These operations are easily encapsulated in simple shell scripts, an example of which is given in the next section.

The Interface Seen by Programs help provides its client processes access to its structure by presenting a file service, as described in Rob Pike, et at., "Plan 9 from Bell Labs", Proc. of the Summer 1990 UKUUG Conf., London, July, 1990, pp. 1–9. Each help window is represented by a set of files stored in numbered directories. The number of each directory is a unique identifier, similar to UNIX process id's. Each directory contains files such as tag and body, which may be read to recover the contents of the corresponding subwindow, and ctl, to which may be written messages to effect changes such as insertion and deletion of text in contents of the window. The help directory is conventionally mounted at /mnt/help, so to copy the text in the body of window number 7 to a file, one may execute cp/mnt/help/7/body file.

To search for a text pattern, grep pattern/mnt/help/7/body

An ASCII file /mnt/help/index may be examined to connect tag file names to window numbers. Each line of this file is a window number, a tab, and the first line of the tag.

To create a new window, a process just opens /mnt/help/new/ctl, which places the new window automatically on the screen near the current selected text, and may then read from that file the name of the window created, e.g. /mnt/help/8. The position and size of the new window is, as usual, chosen by help.

Implementation of Components of the C Browser

The directory /help/cbr contains the C browser we used above. One of the programs there is called decl; it finds the declaration of the variable marked by the selected text. Thus one points at a variable with the left button and then executes ctecl in window 909 for the file /help/cbr/stf. Help executes /help/cbr/decl using the context rules for the executed text and passes it the context (window number and location) of the selected text through an environment variable, helpsel.

Decl is a shell (rc) script. Here is the complete program:

```
eval '{help/parse -c}
x='{cat/mnt/help/new/ctl}
```

-continued

```
{
        echo a
        echo $dir/'   Close!'
} | help/buf >/mnt/help/$x/ctl
{
        cpp $cppflags $file |
                help/rcc -w -g -i$id -n$line | sed 1q
}>/mnt/help/$x/bodyapp
```

The first line runs a small program, help/parse, that examines $helpsel and establishes another set of environment variables, file, id, and line, describing what the user is pointing at. The next creates a new window 103 and sets x to its number. The first block writes the directory name to the tag line 105; the second runs the C preprocessor on the original source file and passes the resulting text to a special version of the compiler. This compiler has no code generator; it parses the program and manages the symbol table, and when it sees the declaration for the indicated identifier on the appropriate line of the file, it prints the file coordinates of that declaration. This appears on standard output, which is appended to the new window by writing to /mnt/help/$x/bodyapp. The user can then point at the output to direct Open to display the appropriate line in the source. (A future change to help will be to close this loop so the Open operation also happens automatically.) Thus with only three button clicks one may fetch to the screen the declaration, from whatever file in which it resides, the declaration of a variable, function, type, or any other C object.

A couple of observations about this example. First, help provided all the user interface. To turn a compiler into a browser involved spending a few hours stripping the code generator from the compiler and then writing a half dozen brief shell scripts to connect it up to the user interface for different browsing functions. Given another language, we would need only to modify the compiler to achieve the same result. We would not need to write any user interface software. Second, the resulting application is not a monolith. It is instead a small suite of tiny shell scripts that may be tuned or toyed with for other purposes or experiments.

Other applications are similarly designed. For example, the debugger interface, /help/db, in window 605, is a directory of ten or so brief shell scripts, about a dozen lines each, that connect adb to help. Adb has a notoriously cryptic input language; the commands in /help/db package the most important functions of adb as easy-to-use operations that connect to the rest of the system while hiding the rebarbative syntax. People unfamiliar with adb can easily use help's interface to it to examine broken processes. Of course, this is hardly a full-featured debugger, but it was written in about an hour and illustrates the principle. It is a prototype, and help is an easy-to-program environment in which to build such test programs. A more sophisticated debugger could be assembled in a similar way, perhaps by leaving a debugging process resident in the background and having the help commands send it requests.

The most important feature of help is that it provides a comfortable, easy-to-program user interface that all applications may share. It greatly simplifies the job of providing an interactive 'front end' for a new application. Help is able to serve as a promtyping system that provides the user interface for a windowing system, freeing the programmer to concentrate on the job at hand, the construction of new software tools.

Conclusion

The foregoing has disclosed how one may make and use an improved user interface for computer systems in which users interact with the system by means of a display device with windows and a mouse. In a preferred embodiment, a three-button mouse is employed; however, in other embodiments, other pointing devices may be employed. Similarly, in a preferred embodiment, the windows are tiled onto the display device; in other embodiments they may simply overlap. Further, while the preferred embodiment deals only with text strings displayed in windows, other embodiments may deal also with icons and other representations of entities in windows. Finally, the techniques used to separate tag and body and to indicate active locations may vary in other embodiments. That being the case, the foregoing Detailed Description is to be regarded as being in all respects exemplary but not restrictive, and the scope of the invention is to be determined not from the Detailed Description, but rather from the appended claims as interpreted in light of the Detailed Description and the doctrine of equivalents.

What is claimed is:

1. In a computing system having one or more windows, each of which displays text from a file belonging to a file system in which each file has one of a plurality of file contexts which are employed by the file system to locate the file, a method for providing an input to the computer system comprising the steps of:

associating each window with the file context for the file whose text is being displayed therein;

receiving a portion of the text selected by a user from anywhere in any given one of the windows; and automatically providing as the input the portion together with the file context for the given one of the windows.

2. The method set forth in claim 1 wherein:

the step of receiving a portion further includes the step of receiving an indication from the user that the portion represents a file to be executed; and when the indication has been received, the step of providing provides the file context together with the portion as the name of a file to be executed.

3. The method set forth in claim 1 wherein:

the step of receiving a portion further includes the step of receiving an indication from the user that the portion represents an argument; and the step of providing provides the file context together with the portion as the argument when the indication has been received.

4. The method set forth in claim 1 wherein:

the input to the computer system is a command to be executed by the computer system and an argument for the command;

the step of receiving a portion includes the steps of:

receiving a first portion from a first one of the windows with an indication from the user that the portion is to be used as an argument;

receiving a second portion from a second one of the windows with an indication from the user that the portion is a file to be executed; and the step of providing includes the steps of providing the first portion as the argument and providing the file context for the second one of the windows together with the second portion as the command.

5. The method set forth in claim 4 wherein:

the argument is a name of a file; and the step of providing the first portion provides the first portion together with the file context for the first one of the windows.

6. The method set forth in any of claims 1 through 5 wherein:

the computing system further includes a shell for executing commands; and the step of providing the file context together with the portion as the input provides the input to the shell as part of a command.

7. A graphical user interface for a computer system having a file system in which each file has one of a plurality of file contexts which are employed by the file system to locate the file, the graphical user interface comprising:

one or more windows, each window displaying text from a file in the file system and being associated with the file context for the file whose text is being displayed therein;

pointing means for specifying a position in one of the windows and including text selection means for selecting text at the position and specifying the use of the selected text in the computer system; and means responsive to the pointing means for automatically providing the selected text from any one of the windows together with the file context associated with that window to be employed in the computer system as specified by the text selection means.

8. The graphical user interface set forth in claim 7 wherein:

the text selection means includes first means for specifying that the selected text is an argument and second means for specifying that the selected text represents an executable file; and the means responsive to the pointing means responds to the text selection means by providing the text and the file context specified by the second means as the name of an executable file to be executed by the computer system and the text specified by the first means as an argument to be used in executing the executable file.

9. The graphical user interface set forth in claim 8 wherein:

the means responsive to the pointing means further responds to the text selection means by providing the text and file context specified by the second means as a file name argument to be used in executing the executable file.

10. The graphical user interface set forth in any of claims 7 through 9 wherein:

the computer system further has a shell for receiving commands; and the means responsive to the pointing means provides the selected text and the file context to the shell.

11. The graphical user interface set forth in claim 10 wherein:

each of the windows is represented by a set of files in the file system; and the computer system performs operations on a window by operating on one or more of the files representing the window.

12. The graphical user interface set forth in any of claims 7 through 9 wherein:

each window further displays the file context for the file whose text is being displayed therein.

* * * * *